C. D. BIRDSEYE.
FILTER.
No. 7,208. Patented Mar. 26, 1850.
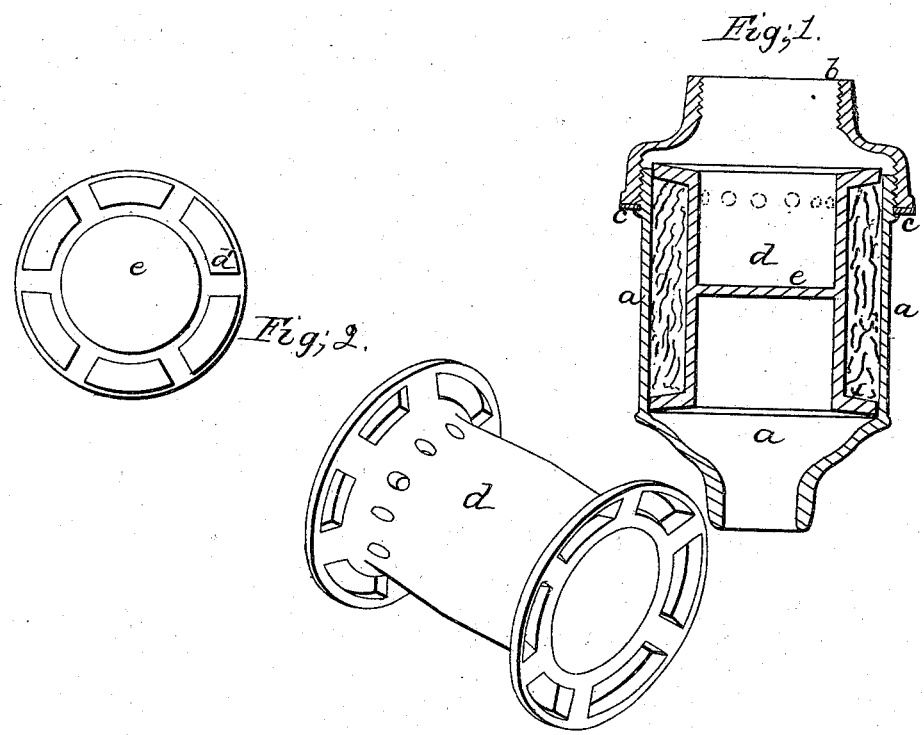

UNITED STATES PATENT OFFICE.

C. D. BIRDSEYE, OF NEW YORK, N. Y., ASSIGNOR TO W. LATTING.

FILTER.

Specification of Letters Patent No. 7,208, dated March 26, 1850.

*To all whom it may concern:*

Be it known that I, C. D. BIRDSEYE, of New York, in the county of New York and State of New York, have invented certain new and useful Apparatus for Filtering Water, and that the following is a full, clear, and exact description of the principle or character which distinguishes them from all other things before known and of the usual manner of making, modifying, and using the same, reference being had to the accompanying drawing, in which—

Figure 1, is a section through the axis. Fig. 2, is a view of the spool.

It is well known that if a series of layers of woolen cloth of any considerable thickness be compressed, it is impossible to make water flow through them; and therefore in that position woolen fabrics could not be employed; besides, as the cloth is fulled by the action of the water, it contracts its diameter, and consequently should a filter be made of that substance, by placing disks of it one above another, in a circular case, although they might fit it when first put in, they would in a short time shrink, so as to be useless, by permitting the water to flow down around its edges, and thus pass through without filtering. To obviate these difficulties, I have found by experiment that I can, by compressing layers of woolen fabrics, and then causing the water to pass down through said layers presented edgewise to the flow, obtain a perfect filtering media, and one that is not affected at all, as I construct it by the fulling and contracting of the fabric. All the filters with which I have been heretofore acquainted, (although some of them can be partially cleaned by reversing) will in time become clogged, if they are efficient in stopping the dirt in the water: but my filter can easily be taken apart by the most ignorant person, and thoroughly washed and cleaned, and will then be equal to a new one; while in the meantime it has all the advantages of being easily reversed.

The construction of my apparatus is as follows:

I construct a suitable cylindrical case (*a*,) of proper caliber, the ends of which are contracted to dimensions suited to the pipe for which it is designed; a female screw (*b*,) being cut in one end, by which the pipe is affixed; the cylinder is also formed in two parts, one of which, the cap, screws to the other at (*c*,) with a packed joint; within the cylinder I place what I denominate a spool (*d*,) formed of a cylinder, with two projecting flanches, one at each end; these flanches fit the interior of case (*a*,) tightly, the body of the spool being smaller; this latter part is of smaller diameter at each end than in the center, when it approaches the outer case the nearest, as clearly shown in the drawing, Fig. 1; the interior of the spool is hollow, with a diaphragm (*e*,) at the center, forming two cups, one at each end, which are exactly alike, as the spool is reversible: the cups serve to catch any accumulation of dirt that does not enter the filtering media: the spool thus formed is tightly wound with flannel or other suitable woven woolen fabrics, and then inserted into its place, as shown in Fig. 1, where it will be seen the center is very much compressed; holes are made either in the flange above named, or in the sides of the spool near each end, as shown in the figures: through these the water enters the filtering media, at a point where it is least compressed, and then follows down through and between the strata or folds, with a free delivery and a perfect filtration. It will at once be seen, that as the fabric fulls and becomes shorter, it thickens, so as to maintain the same density at all times: the cloth it will be obvious, can be taken off and washed, and again wound on by any person; this will restore the filter at any time to perfect action.

Having thus fully described my improved filter, what I claim therein as new, and for which I desire to secure Letters Patent, is—

The construction and arrangement of the filter with a woolen woven fabric wound on to a spool, substantially as herein set forth, and admitting the water so as to pass down through the cloth presented edgewise, as above fully described.

CHAS. D. BIRDSEYE. [L. S.]

Witnesses:
JAMES A. MURRAY,
J. B. D. CLARK.